US 6,857,123 B1

United States Patent
Nuxoll et al.

(10) Patent No.: US 6,857,123 B1
(45) Date of Patent: Feb. 15, 2005

(54) METHOD AND APPARATUS FOR A META DATA SERVICE IN A DATA PROCESSING SYSTEM

(75) Inventors: Andrew Max Nuxoll, Indianapolis, IN (US); Gordon Scott Rulong, Indianapolis, IN (US); Douglas Andrew Wood, Indianapolis, IN (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 09/215,752

(22) Filed: Dec. 18, 1998

(51) Int. Cl.$^7$ ................................................ G06F 9/54
(52) U.S. Cl. .................... 719/316; 707/102; 707/103 R
(58) Field of Search ................................ 709/200–219, 709/310–332; 719/315–317; 707/1–10, 100–104.1, 200–206

(56) References Cited

U.S. PATENT DOCUMENTS

| | | | |
|---|---|---|---|
| 5,432,925 A | 7/1995 | Abraham et al. | 395/500 |
| 5,437,025 A | 7/1995 | Bale et al. | 395/600 |
| 5,499,371 A | 3/1996 | Henninger et al. | 395/700 |
| 5,509,123 A | 4/1996 | Dobbins et al. | 395/200 |
| 5,548,779 A | 8/1996 | Andert et al. | 395/823 |
| 5,555,365 A | 9/1996 | Selby et al. | 395/159 |
| 5,590,327 A | 12/1996 | Biliris et al. | 395/670 |
| 5,634,054 A | 5/1997 | Sarachan | 395/611 |
| 5,644,764 A | 7/1997 | Johnson et al. | 395/614 |
| 5,710,920 A * | 1/1998 | Maruyama et al. | 707/103 |
| 5,717,925 A * | 2/1998 | Harper et al. | 707/102 |
| 5,963,958 A * | 10/1999 | Cottrill | 707/104 |
| 5,991,823 A * | 11/1999 | Cavanaugh, III et al. | 709/304 |

OTHER PUBLICATIONS

Lippman et al., "Media Banks: Entertainment and the Internet," IBM Systems Journal—vol. 35, Nos. 3 & 4, 1996.*
IBM Technical Disclosure Bulletin; Object Attributes on Demand in a Cooperative Processing Environment; vol. 37 No. 09 Sep. 1994.
IBM Technical Disclosure Bulletin; Automated Support Code Generation for an Object Oriented System; vol. 38 No. 03 Mar. 1995.
Pauw, PA; An Operational Metadata System for C++; Aug. 1992; pp. 215–223; Technology of Object-oriented Languages and Systems Tools 8. Proceedings of the $8^{th}$ International Conference, Santa Barbara, CA.

* cited by examiner

Primary Examiner—St. John Courtenay, III
(74) Attorney, Agent, or Firm—Duke W. Yee; Jeffrey S. LaBaw; Stephen R. Tkacs

(57) ABSTRACT

As a solution to the problem of distributed knowledge of data object definitions, data object definitions are removed from the source code. A Meta Data Service is created and made available on a network which knows the definitions of all of the objects that are used by applications that are designed to use the Meta Data Service. When an object is created, the Meta Data Service creates and stores a meta definition for the object. Data objects are passed over a network in a "soft" format. Applications within a distributed data processing system are designed in such a manner such that, at any stage of object processing, an application does not assume to understand the definition or structure of an object, nor is an application hard-coded with the object definitions. At each stage, an application queries the Meta Data Service for the meta definition of the object before proceeding with the processing of an object. The application then receives a meta definition for the data object that allows the application to perform properly tailored processing for the data object.

16 Claims, 6 Drawing Sheets

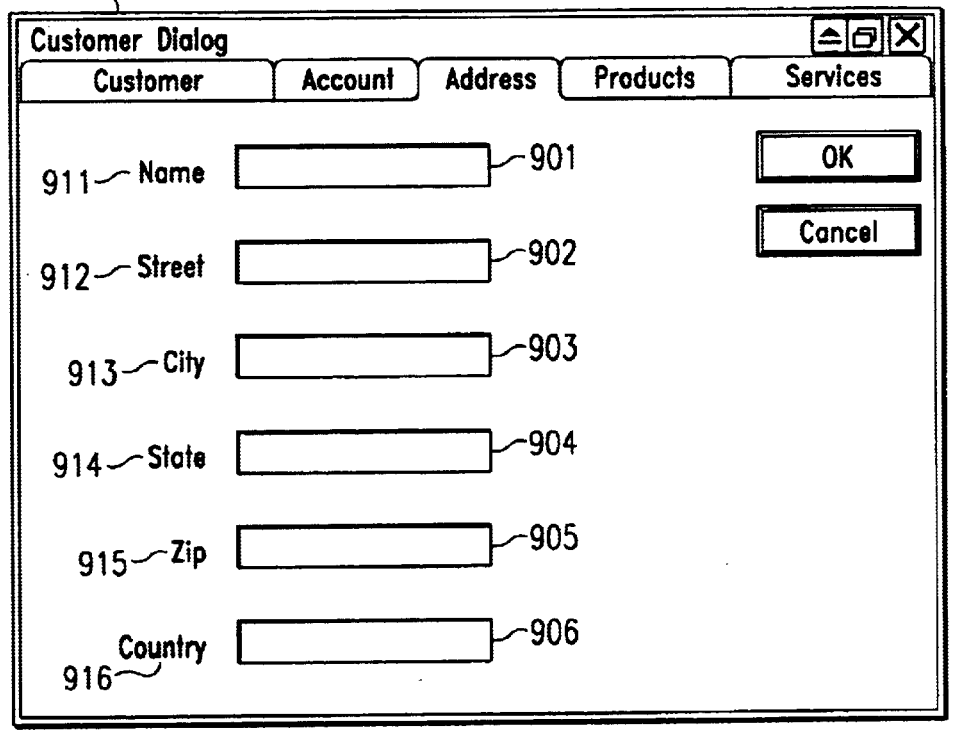

METHOD AND APPARATUS FOR A META DATA SERVICE IN A DATA PROCESSING SYSTEM

BACKGROUND OF THE INVENTION

1. Technical Field

The present invention relates to a method and apparatus for sharing data between resources. Specifically, the method involves providing meta data definitions for data processing of data objects.

2. Description of Related Art

Many applications utilize data that has been formatted a particular way. When se another application requires the same data, a second application may attempt to retrieve that data from a first application. Unfortunately, the second application may require the data in a different format than that used by the first application. For example, one organization might identify the submitter of a help desk incident by the submitter's customer number while another organization might use the submitter's physical location or local area network (LAN) address. The different data formats expected by the different applications present a obstacle to the efficient sharing of data between applications.

Traditionally, making a change to an application to accommodate this type of difference would involve changing the source code or data structures which describe the object (and possibly other code) and then regenerating the application. The traditional update method implies the availability of the source code and creates a need to maintain the changed source code. Therefore, it would be advantageous to have an improved method and apparatus to share data between different applications.

SUMMARY OF THE INVENTION

As a solution to the problem of distributed knowledge of data object definitions, data object definitions are removed from the source code. A Meta Data Service is created and made available on a network which knows the definitions of all of the objects that are used by applications that are designed to use the Meta Data Service. When an object is created, the Meta Data Service creates and stores a meta definition for the object.

Using this solution, data objects are passed over a network in a "soft" format. Applications within a distributed data processing system are designed in such a manner such that, at any stage of object processing, an application does not assume to understand the definition or structure of an object, nor is an application hard-coded with the object definitions. At each stage, an application queries the Meta Data Service for the meta definition of the object before proceeding with the processing of an object. The application then receives a meta definition for the data object that allows the application to perform properly tailored processing for the data object.

One of ordinary skill in the art will understand that the advantage of the Meta Data Service could not be accomplished using the subclassing feature of an object-oriented language. In other words, adding an attribute to an object's meta definition is not equivalent to subclassing an object. When an object is extended by subclassing, the object adopts a new object type. With the Meta Data Service, an object maintains its original object type.

Without the Meta Data Service of the present invention, the definition of the objects would be embedded in the application source code. Costly alterations to the original source code would be required, and the original source code may not be available to be altered. With the Meta Data Service of the present invention, the existing code receives newly created object attributes in the receipt of the meta definitions of the object. Capabilities for processing the newly created object attributes are available in all software or application components at all processing points that process the object.

If a customer merely requires the storage of the new attribute, the update to the object requires no additional configuration work for the customer. Object attributes are passed from a client through any number of servers to the database. If, however, the customer wishes to perform processing on the newly created attribute, the customer may build a dedicated server.

Within some limits imposed by various databases, the Meta Data Service is able to alter the definition of the data storage of a database to reflect a change in the meta definition of any objects that the Meta Data Service manages. This is the reverse of typical fourth-generation languages (4GL's) where the database schema may drive the definitions of some of the constructs in the language. The initial database schema is automatically created by a meta data manager from the definitions of the objects that it is managing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8 and 9 are examples of graphical user interface windows that are presented to a user so that a user may enter data values for the attributes of a data object.

FIG. 10A is an example of a meta definition for an object.

FIG. 10B is an example of a data stream containing data values for an object's attributes.

FIG. 10C is an example of a meta definition for an object with an extended attribute.

DETAILED DESCRIPTION OF THE PREFERRED EMBODIMENT

Figure 1:
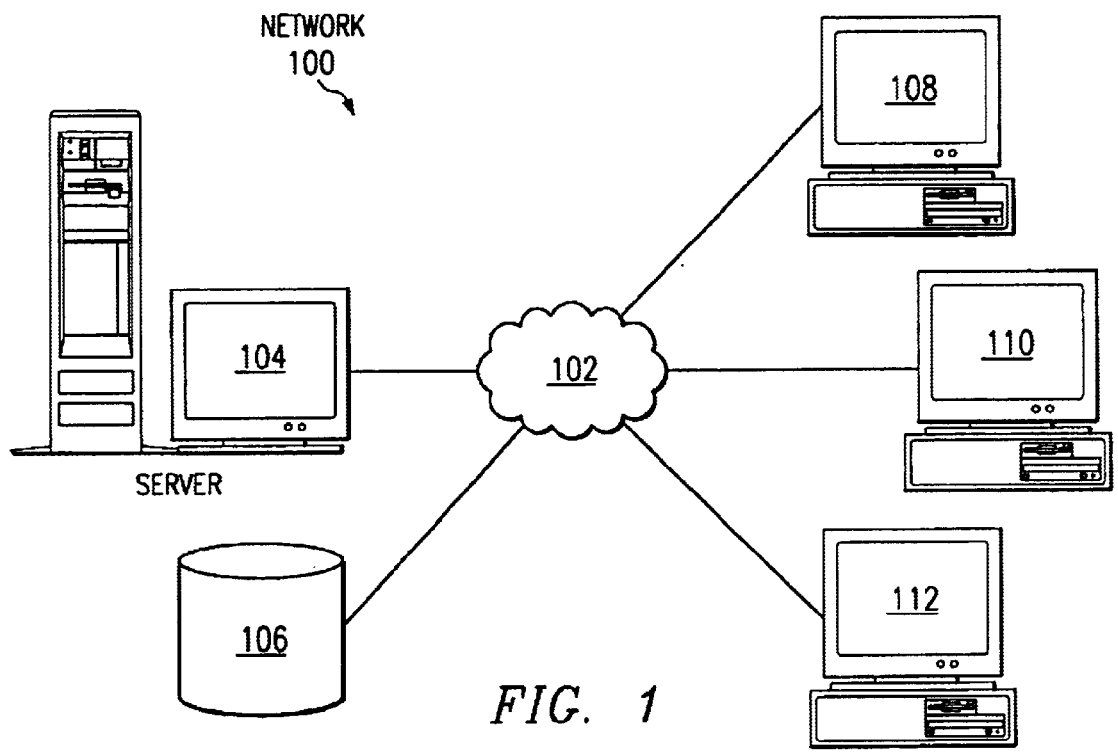
FIG. 1 depicts a pictorial representation of a distributed data processing system in which the present invention may be implemented.

With reference now to the figures, FIG. 1 depicts a pictorial representation of a distributed data processing system in which the present invention may be implemented.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN).

FIG. 1 is intended as an example, and not as an architectural limitation for the processes of the present invention.

Figure 2:
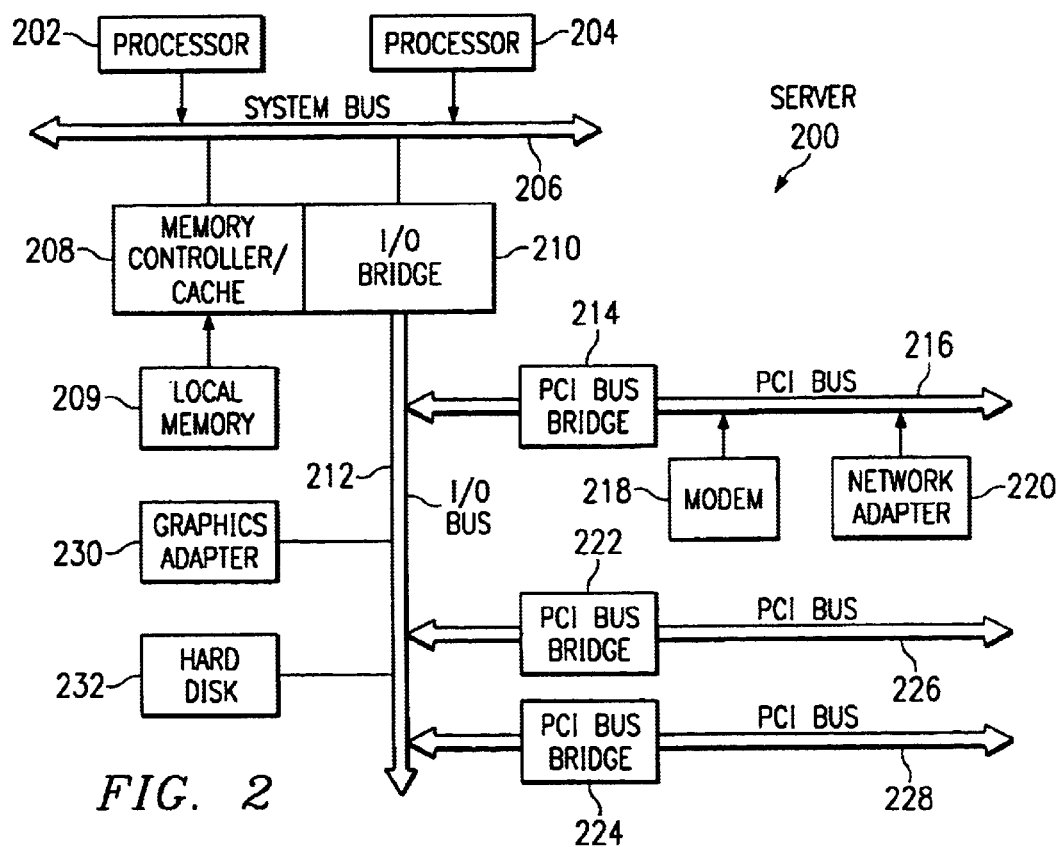
FIG. 2 is a block diagram depicting a data processing system, which may be implemented as a server in a distributed data processing system.

Referring to FIG. 2, a block diagram depicts a data processing system, which may be implemented as a server, such as server 104 in FIG. 1, in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an to interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
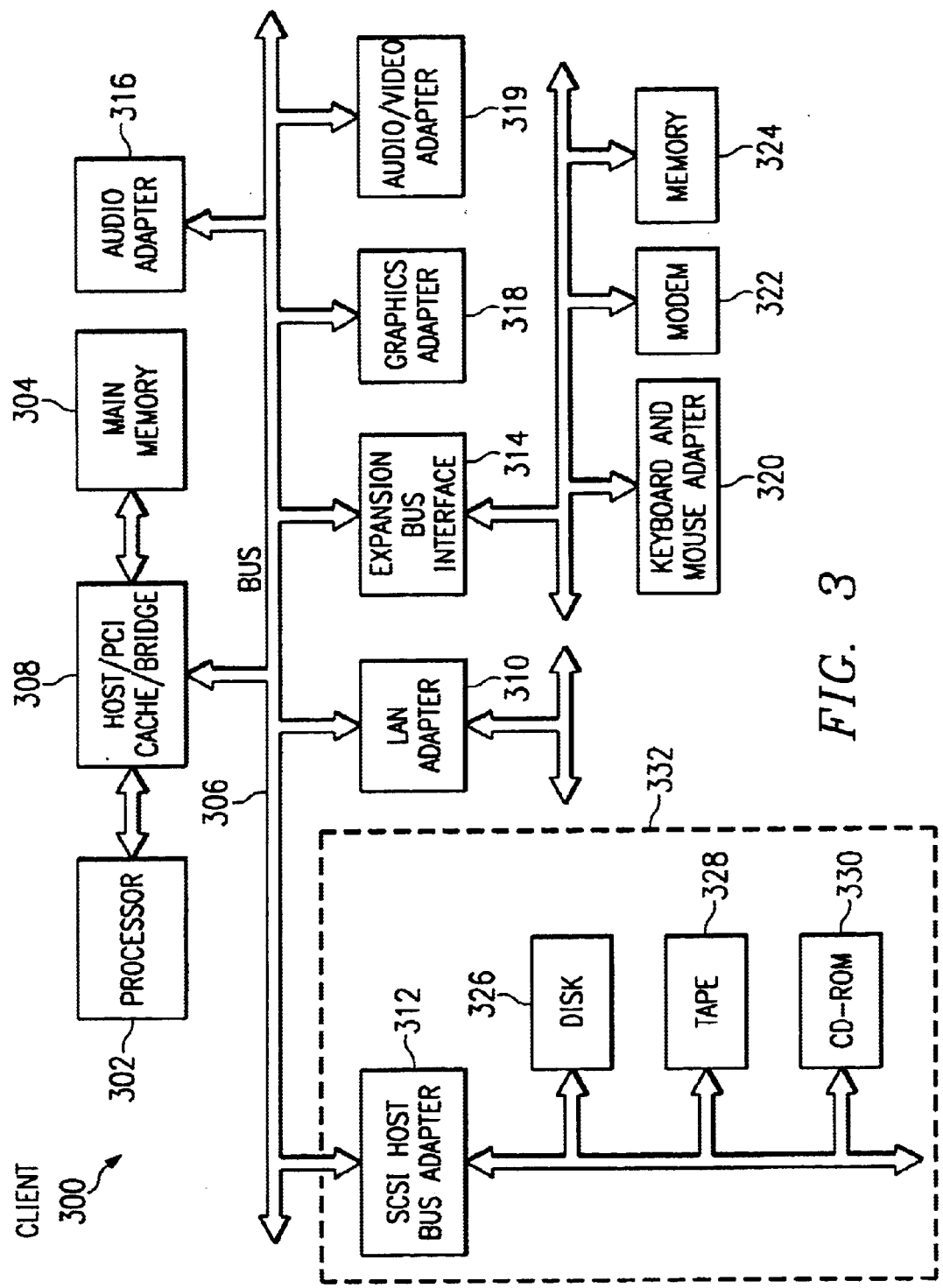
FIG. 3 is a block diagram illustrating a general data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and printer adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors. Data processing system 300 could be connected through graphics adapter 318 to a computer display (not shown) and through printer adapter 319 to a printer (not shown).

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java™ may run in conjunction with the operating system and provides calls to the operating system from Java™ programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3.

Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention.

Figure 4:
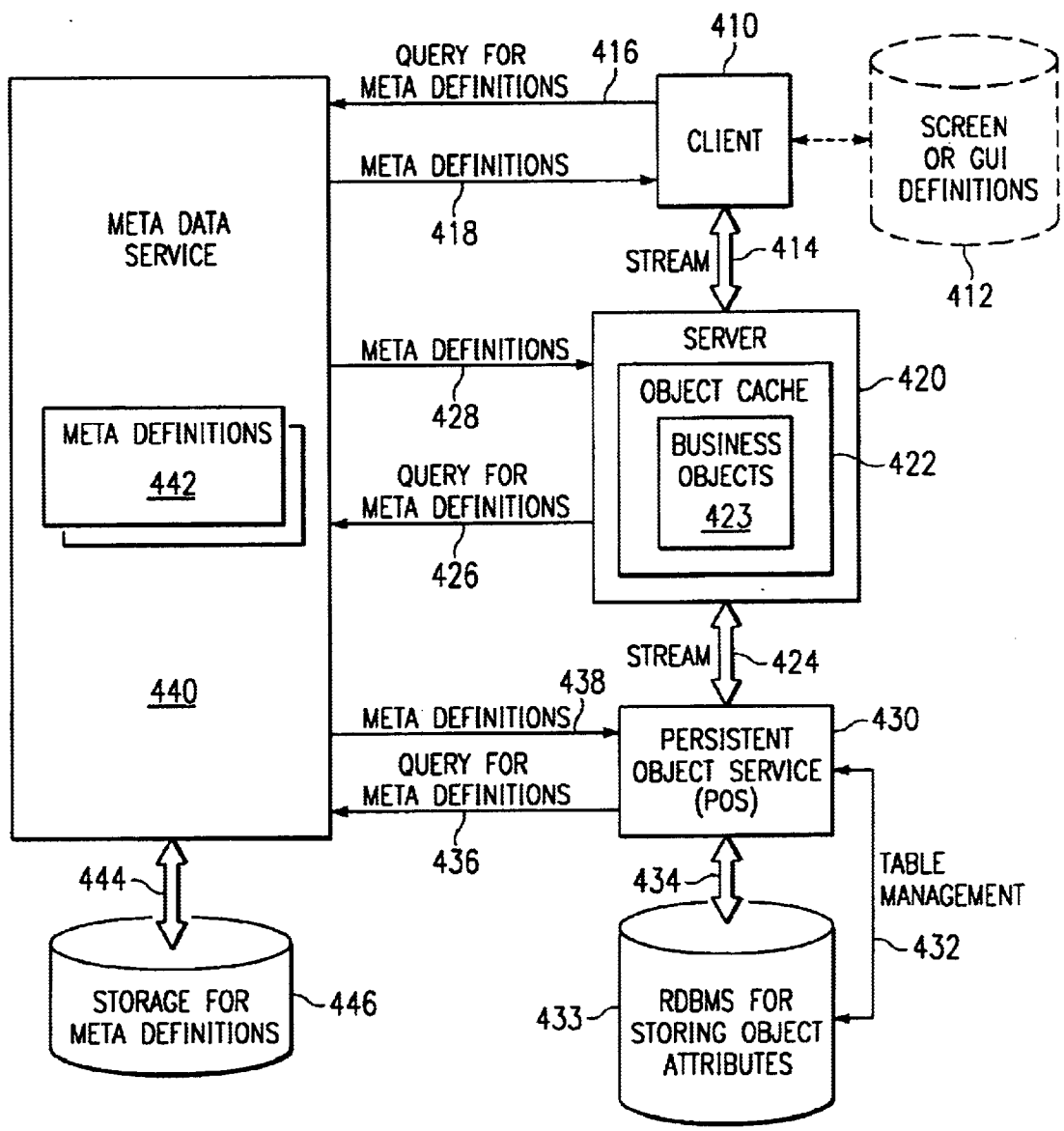
FIG. 4 is a block diagram depicting an example in which the Meta Data Service may be used to collect and store data in a database.

With reference now to FIG. 4, a block diagram depicts an example in which the Meta Data Service may be used to collect and store data in a database. In summary, client 410 may be one of clients 108, 110, and 112 connected to a network 102, shown in FIG. 1. Client 410 collects values for the attributes of an object from a user through a graphical user interface (GUI) and submits them to server 420 for processing. Server 420 may be similar to server 104, shown in FIG. 1. The attributes are eventually stored in a relational database management system (RDBMS) 433. At each stage of object processing, Meta Data Service 440 is queried for meta definitions 442, which may be stored to and retrieved from meta definition storage 446 by data stream 444.

It should be noted that FIG. 4 describes an embodiment of the invention in which the Meta Data Service and the applications that use the Meta Data Service are distributed in a distributed data processing system. Meta Data Service 440 may be located on one server in network 102; a user is entering data into client 410 elsewhere on network 102; server 420 is not necessarily the same server that holds Meta Data Service 440 or POS 430, which may be located elsewhere in network 102. However, the application that is presenting the GUI to the user, Meta Data Service 440, POS 430, and RDBMS 433 could be located within a single stand-alone data processing system 300. In that case, Meta Data Service 440, POS 430, and RDBMS 433 could be separate software components or applications that contain processing logic similar to what would be found in software components or applications distributed across network 102.

Figure 5:
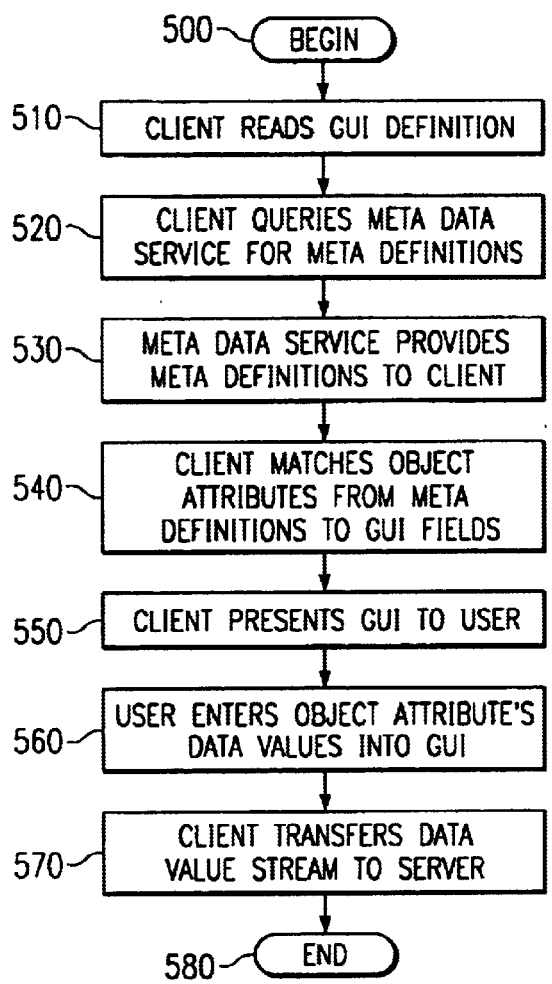
FIG. 5 is a flowchart depicting a method used by a client to accept user input to be stored as data values for the attributes of the object that will eventually be stored in a database.
Figure 6:
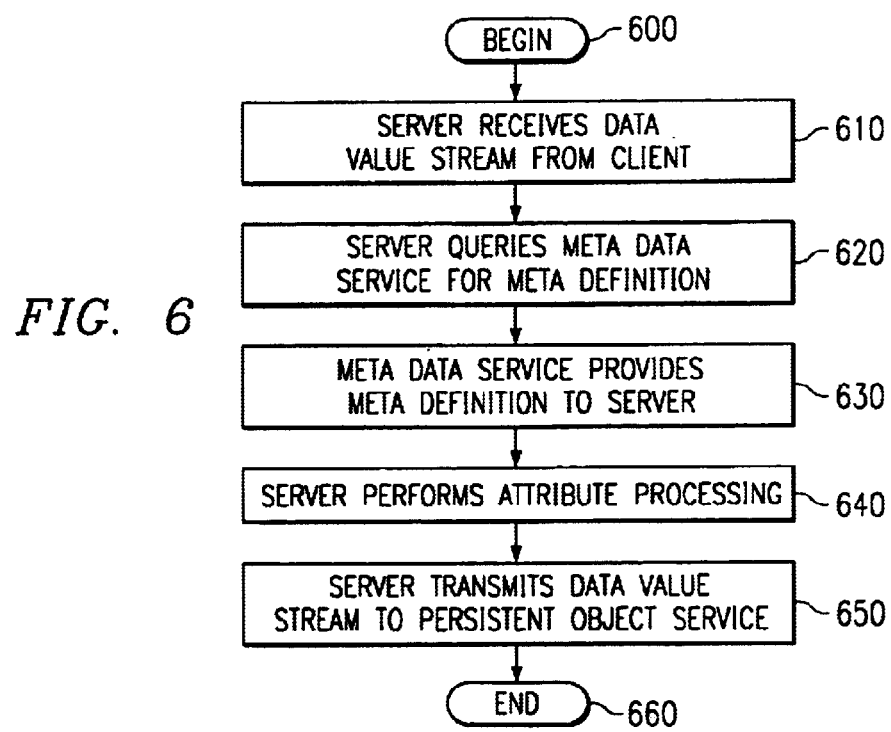
FIG. 6 is a flowchart depicting a method used by a server to accept a stream of data values for object attributes that are eventually stored in a database.
Figure 7:
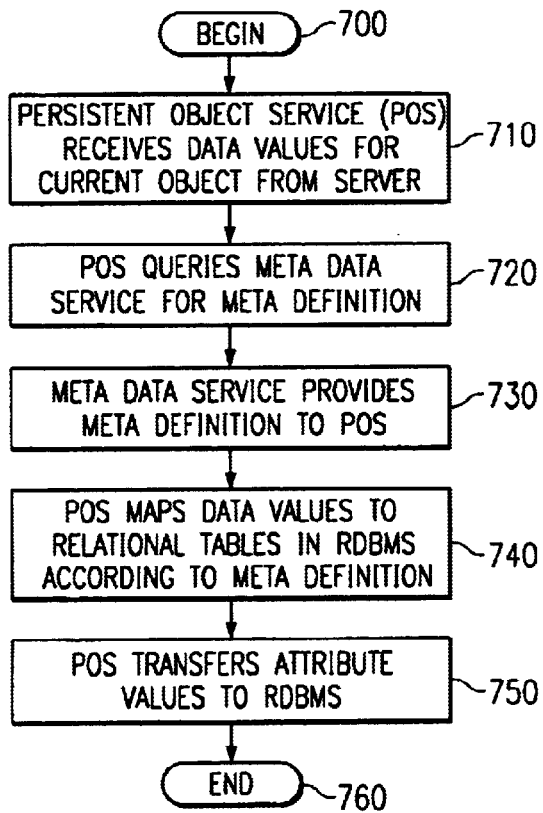
FIG. 7 is a flowchart depicting a method used by a Persistent Object Service in accepting a stream of data values for object attributes that are eventually stored in a database.

FIGS. 5–7 provide flowcharts and the accompanying discussion provide further detail for the processing and data-flow shown in FIG. 4.

With reference now to FIG. 5, a flowchart depicts a method used by a client to accept user input to be stored as data values for the attributes of the object that will eventually be stored in RDBMS 433. The process begins (step 500) when client 410 reads a definition of a screen in which the user will enter values for the object attributes (step 510). Screen or GUI definitions 412 may be stored in client 410, server 420, or even RDBMS 433. In other words, GUI definitions 412 may be stored in any location on distributed data processing system 100 such that client 410 may retrieve the definitions for presentation use. Alternatively, GUI definitions 412 may not be predefined, in which case a GUI is built on-the-fly, as further described below.

An application executing on client 410 determines that user input is required for further processing. Client 410 requests a meta definition of the current object, i.e., the definition of the attributes for the current object, from Meta Data Service 440 (step 520). Query for meta definition 416 is routed through network 102 to Meta Data Service 440. In response, Meta Data Service 440 provides meta definition 418 to client 410 (step 530). Client 410 matches object attributes provided in meta definition 418 to GUI fields (step 540) and presents the GUI to the user (step 550).

Figure 8:
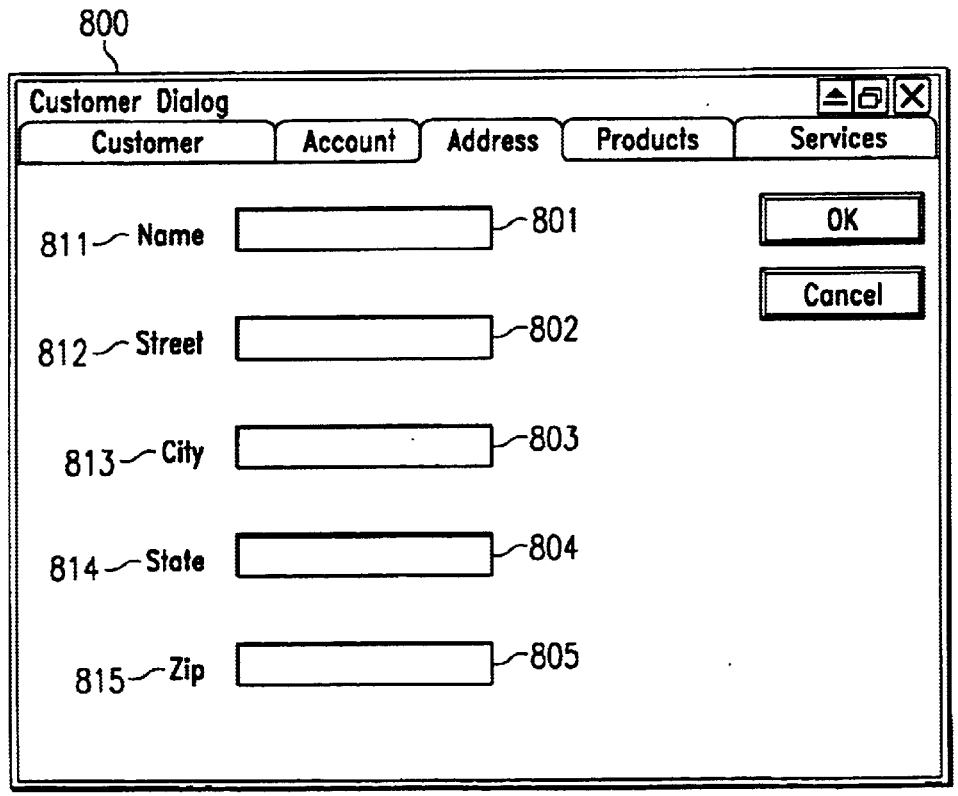

An example of a GUI is provided in FIG. 8 as Customer Dialog 800. The object attributes may be used as field labels 811–815 in Customer Dialog 800, wherein the fields are text entry fields 801–805 in which the user provides data values for the object attributes. The matching process may be accomplished by a simple name matching basis or by using a more complicated identification mechanism. In some cases, it may not be desired to have a predefined screen definition for a variety of reasons, such as system administration costs for maintaining properly defined screen definitions. In many cases, it may be possible for client 410 to build a screen definition from the object attributes in meta definition 418.

One of ordinary skill in the art would understand that client 410 need not be coded to assume the presence of any attribute in the meta definition of an object. However, since it is possible to verify an attribute's presence, attribute specific processing is not precluded.

After the user has entered all the data (step 560), client 410 submits the object for processing by one or more servers by transferring the object across the network or to a server process in the form of a stream of attribute data values 414 (step 570). The client-based processing of the current object then ends (step 580).

With reference now to FIG. 6, a flowchart depicts a method used by a server in accepting a stream of data values for object attributes that are eventually stored in RDBMS 433. The process begins (step 600) when server 420 receives data value stream 414 from client 410 (step 610). Server 420 requests a meta definition of the current object, i.e., the definition of the attributes for the current object, from Meta Data Service 440 (step 620). Query for meta definition 426 is routed through network 102 to Meta Data Service 440. In response, Meta Data Service 440 provides meta definition 428 to server 420 (step 630).

One of ordinary skill in the art would understand that server 420 need not be coded to assume the presence of any attribute in the meta definition of an object. However, since it is possible to verify an attribute's presence, attribute specific processing is not precluded.

Meta definition 428 allows server 420 to interpret the recently received data stream for the current object. Server 420 performs any necessary attribute processing, according to meta definition 428, that may be required at this stage of processing (step 640). For example, it may be advantageous to verify the correctness and appropriateness of the user input values at a central location, such as server 420, rather than at a decentralized location, such as client 410. When server 420 completes its processing, it may transfer the current object to a different server on network 102 that processes different attributes. Server 420 then transmits the object as data value stream 424 to Persistent Object Service (POS) 430 (step 650). The server-based processing of the current object then ends (step 660).

With reference now to FIG. 7, a flowchart depicts a method used by a Persistent Object Service in accepting a stream of data values for object attributes that are eventually stored in RDBMS 433. The process begins (step 700) when POS 430 receives data value stream 424 from server 420 (step 710). POS 430 requests a meta definition of the current object, i.e., the definition of the attributes for the current object, from Meta Data Service 440 (step 720). Query for meta definition 436 is routed through network 102 to Meta Data Service 440. In response, Meta Data Service 440 provides meta definition 438 to POS 430 (step 730).

One of ordinary skill in the art would understand that POS 430 need not be coded to assume the presence of any attribute in the meta definition of an object. However, since it is possible to verify an attribute's presence, attribute specific processing is not precluded.

Meta definition 438 allows POS 430 to interpret the recently received data stream for the current object. POS 430 maps the data values for the object to relational tables according to meta definition 438 (step 740). At other times, POS 430 may perform table management 432 to update relational tables in RDBMS 433 according to meta definition 438. Server 430 then transmits the object as data 434 to RDBMS 433 (step 750). The POS-based processing of the current object then ends (step 760).

As shown with respect to FIGS. 4–7, applications within distributed data processing system 100 are designed such that, at any stage of object processing, an application does not assume to understand the definition or structure of an object, nor is an application hard-coded with the object definitions. At each stage, an application queries the Meta Data Service for the meta definition of the object before proceeding with the processing of an object.

Structuring applications in conjunction with the Meta Data Service in this manner can be advantageous. For example, a corporation might create a set of applications that use some group of objects to perform corporate tasks and has a group of servers that perform those tasks with those objects. However, those applications could be sold to a customer that finds the objects defined in the applications to be inadequate for its own needs.

Thus, with the present invention, the customer may alter the definitions of one or more of the objects within the Meta Data Service to add the attributes which the customer wishes to process. Since all software or application components query a single location, the Meta Data Service, for the definitions of the objects at each processing point that requires knowledge of an object, the object definitions need to be altered in only a single location, the meta definitions within the Meta Data Service, and do not need to be altered in several different software components.

One of ordinary skill in the art will understand that the advantage of the Meta Data Service could not be accomplished using the subclassing feature of an object-oriented language. In other words, adding an attribute to an object's meta definition is not equivalent to subclassing an object. When an object is extended by subclassing, the object adopts a new object type. With the Meta Data Service, an object maintains its original object type.

Without the Meta Data Service of the present invention, the definition of the objects would be embedded in the application source code. Costly alterations to the original source code would be required, and the original source code may not be available to be altered. With the Meta Data Service of the present invention, the existing code receives newly created object attributes in the receipt of the meta definitions of the object. Capabilities for processing the newly created object attributes are simultaneously available in all software components or application components at all processing points that process the object.

If a customer merely requires the storage of the new attribute, the update to the object requires no additional work for the customer. Object attributes are passed from a client through any number of servers to the database. If, however, the customer wishes to perform processing on the newly created attribute, the customer may build a dedicated server.

FIGS. 8–9 provide an example of a specific application of the Meta Data Service.

With reference again to FIGS. 4 and 8, a dialog window provides an example of a GUI for presenting an object's attributes to a user. A programmer may create this GUI definition 412 and present it as Customer Dialog 800 in order to obtain an address for a corporate customer. To do this, the programmer may create an "Address" object with meta definition 442 shown in FIG. 10A.

The definition of the attributes may have additional information that is not shown, such as data type (e.g., ASCII or integer) or display information, such as fonts or colors.

Customer Dialog 800 may have a data entry field for each attribute in the object, and the data entry field may have a name that matches the name of the attribute. For example, data entry field 802 is labeled "Street" by label 812 that matches the "Street" attribute or attribute #3 of the meta definition of "Address" in FIG. 10A.

Once the data is gathered by client 410, it creates a data stream 414 to send the data to server 420. In this example, the stream might resemble the data stream shown in FIG. 10B.

The first item on the stream identifies the meta definition used to build the stream. In this example, the stream is simple an ordered list of the attribute values. If an attribute did not have a value, a place-holder could be put in the stream. More complicated stream formats could be defined that pass data more efficiently, such as passing only those values that have been modified.

When server 420 receives stream 414, it creates a container to hold the stream. Server 420 uses the meta ID from the stream to get the number and meaning of the attributes on the stream by querying Meta Data Service 440 for meta definition 428 of the object or objects in the stream. The meta ID may be a simple integer, as shown, or the meta ID may be a text string which is used as a part of a query by Meta Data Service 440 to a database acting as storage for meta definitions 446.

Server 420 could request the value of attributes of the object from the container. If the attributes were requested by name, the container could validate that specific attributes were present. Server 420 could also request the attributes by attribute ID, which would allow server 420 to validate the object's attributes against the object's meta definition 428 before processing a group of similar objects.

When server 420 has completed the processing for the object, server 420 passes the object to Persistent Object Storage 430 for storage in relational database management system 433. POS maps the object attributes onto tables and columns in the database. For this example, there may be a table named "Address", which has one column for each attribute. The column name matches the attribute name. It is important to note that the RDBMS schema would be driven by the meta definition not the reverse.

Now assume that the programmer who wrote the original application sells it to a corporation that has international operations. The corporation determines that it must also have a country name in its address information. To accomplish this, it may change the meta definition of "Address" to resemble modified meta definition 442 shown in FIG. 10C by adding an attribute, attribute #7 named "Country". Note that the classification of attributes is optional and that the use of "base attributes" and "extend attributes" may merely simplify the validation of the attributes that are received in a given meta definition.

The definition of the GUI screen must also be edited to add a data entry field "Country". An example of a modified GUI is provided in FIG. 9 as Customer Dialog 900 that has been modified from Customer Dialog 800 to include additional data entry field 906. The object attributes in the meta definition for "Address" may be used as field labels 911–916 in Customer Dialog 900, wherein the fields are text entry fields 901–906 in which the user provides data values for the object attributes. Customer Dialog 900 contains data entry field 906 labeled "Country" by label 916 that matches the "Country" attribute or attribute #7 of the meta definition of "Address".

When the meta definition for the "Address" object is extended, Meta Data Service 440 may contact POS 430 to request that it add a column "Country" to the table named "Address" to accommodate the new attribute.

The modification of RDBMS 433 and GUI definition 412 may be performed through a system administration utility in Meta Data Service 440 or is performed semi-automatically by Meta Data Service 440 during creating of the new object attribute.

Client 410 will find new "Country" data entry field 906 in GUI definition 412 and will also find that the "Address" object, as defined by meta definition 418 has a "Country" attribute in which to store its value. Server 420 and POS 430 will also get the newly defined "Country" attribute for the "Address" object from meta definition 428 and meta definition 438. Each processing point in all software components or application components is aware of the newly created "Country" attribute and handles it correctly. It would also be possible for the system to incorporate a new server to process the "Country" attribute.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a software component for processing a data object in a data processing system, said method comprising the computer-implemented steps of:

sending a query for a meta definition of a data object;

receiving the meta definition for the data object;

identifying object attributes in the meta definition; and prompting a user to input data values corresponding to the object attributes.

2. The method according to claim 1 further comprising, before querying for a meta definition of a data object, determining an object type of a data object.

3. The method according to claim 1 wherein the software component is in a client.

4. The method according to claim 1 wherein the query for the meta definition for the data object is sent to a Meta Data Service.

5. The method according to claim 4 wherein the meta definition is cached to improve the performance of the Meta Data Service.

6. The method of claim 1, further comprising:

receiving inputted data values corresponding to the object attributes from the user; and sending a data value stream including the inputted data values to a server.

7. The method of claim 1, wherein the step of prompting the user for data values comprises:

matching the meta definition to graphical user interface fields; and presenting the graphical user interface fields to the user.

8. A method in a software component for processing a data object in a data processing system, said method comprising the computer-implemented steps of:

receiving a data value stream;

sending a query for a meta definition of a data object;

receiving a meta definition of the data object; and mapping data values to a data structure according to attributes in the meta definition of the data object;

wherein the software component is a Persistent Object Service.

9. A data processing system for processing a data object, said data processing system comprising:

querying means for querying for a meta definition of a data object;

receipt means for receiving the meta definition for the data object;

identification means for identifying object attributes in the meta definition; and prompting means for prompting a user to input data values corresponding to the object attributes.

10. The data processing system according to claim 9 further comprising determination means for determining an object type of a data object before querying a Meta Data Service for a meta definition of a data object.

11. The system of claim 9, further comprising:

means for receiving inputted data values corresponding to the object attributes from the user; and means for sending a data value stream including the inputted data values to a server.

12. The system of claim 9, wherein the prompting means comprises:

means for matching the meta definition to graphical user interface fields; and means for presenting the graphical user interface fields to the use.

13. A computer program product for use with a data processing system for processing a data object, said computer program product comprising:

a computer usable medium;

first instructions for sending a query for a meta definition of a data object;

second instructions for receiving the meta definition for the data object;

third instructions for identifying object attributes in the meta definition; and fourth instructions for prompting a user to input data values corresponding to the object attributes.

14. The computer program product according to claim 13 further comprising instructions for determining an object type of a data object before querying a Meta Data Service for a meta definition of a data object.

15. A method in a software component for processing a data object in a data processing system, said method comprising the computer-implemented steps of:

receiving a data value stream;

sending a query for a meta definition of a data object;

receiving meta definition of the data object; and mapping data values to a data structure according to attributes in the meta definition of the data object, wherein the data structure is a database and wherein the database is a relational database.

16. A data processing system for processing a data object, said data processing system comprising:

first receipt means for receiving a data value stream;

sender means for sending a query for a meta definition of a data object;

second receipt means for receiving the meta definition of the data object; and mapping means for mapping data values to a data structure according to attributes in the meta definition of the data object, wherein the data structure is a database and wherein the database is a relational database.

* * * * *